United States Patent
Denis et al.

(10) Patent No.: US 12,487,260 B2
(45) Date of Patent: Dec. 2, 2025

(54) DEVICE FOR ANALYZING RADIOFREQUENCY SIGNAL SPECTRA

(71) Applicants: UNIVERSITE PARIS CITE, Paris (FR); CENTRE NATIONAL DE LA RECHERCHE SCIENTIFIQUE, Paris (FR)

(72) Inventors: Zakari Denis, Lausanne (CH); Ivan Favero, Paris (FR); Cristiano Ciuti, Paris (FR)

(73) Assignee: UNIVERSITE PARIS CITE, Paris (FR)

( * ) Notice: Subject to any disclaimer, the term of this patent is extended or adjusted under 35 U.S.C. 154(b) by 48 days.

(21) Appl. No.: 18/559,470

(22) PCT Filed: May 11, 2022

(86) PCT No.: PCT/EP2022/062749
§ 371 (c)(1),
(2) Date: Nov. 7, 2023

(87) PCT Pub. No.: WO2022/238465
PCT Pub. Date: Nov. 17, 2022

(65) Prior Publication Data
US 2024/0241159 A1 Jul. 18, 2024

(30) Foreign Application Priority Data
May 12, 2021 (EP) .................................. 21173660

(51) Int. Cl.
*G01R 23/17* (2006.01)
(52) U.S. Cl.
CPC .................... *G01R 23/17* (2013.01)

(58) Field of Classification Search
CPC ....................................................... G01R 23/17
(Continued)

(56) References Cited

U.S. PATENT DOCUMENTS

| 4,695,790 A | 9/1987 | Mathis |
| 5,481,183 A | 1/1996 | Johnson et al. |

(Continued)

FOREIGN PATENT DOCUMENTS

| FR | 2775790 A1 | 9/1999 |
| FR | 3057399 A1 | 4/2018 |
| WO | 2014116128 A1 | 7/2014 |

*Primary Examiner* — Roberto Velez
(74) *Attorney, Agent, or Firm* — Colson Law Group, PLLC (57) ABSTRACT

An optoelectronic device for extracting characteristics in analog radiofrequency signals, forming an analog input signal, the device comprising: an input module generating an optical carrier wave and performing a modulation of this carrier by the analog input signal, to form a modulated optical signal; a network of linear optical cavities optically pumped and coupled by the modulated optical signal; an optical device for measuring the measured quantities of the optical fields, these optical fields being induced by the optical signal modulated by the analog input signal; a calculation module performing a linear transformation on the measured quantities of the optical fields; to make it possible to reconstruct and extract targeted characteristics contained in the spectrum of the radiofrequency input signal, the calculation module having performed machine learning on noisy analog radiofrequency drive signals having the same targeted characteristics in order to determine parameters.

26 Claims, 7 Drawing Sheets

(58) Field of Classification Search
USPC .......................................... 324/76.36, 76.19
See application file for complete search history.

(56) References Cited

U.S. PATENT DOCUMENTS

| | | | |
|---|---|---|---|
| 6,307,655 B1 | 10/2001 | Jelks | |
| 9,413,372 B1* | 8/2016 | Valley | G01R 23/17 |
| 2002/0121890 A1* | 9/2002 | Levitt | G01R 23/17 |
| | | | 324/76.36 |
| 2018/0131445 A1 | 5/2018 | Esman et al. | |
| 2019/0212377 A1 | 7/2019 | Song et al. | |

* cited by examiner

DEVICE FOR ANALYZING RADIOFREQUENCY SIGNAL SPECTRA

TECHNICAL FIELD

The invention relates to the technical field of spectrum analysis of radiofrequency signals.

PRIOR ART

The invention relates to the extraction of features contained in the spectrum of radiofrequency signals.

Radiofrequency here refers to electromagnetic wave frequencies between 3 Hz and 300 GHz, including the frequencies used for mobile telephony and Wi-Fi, as well as signals used in particular for radars.

The invention thus finds applications in the processing of signals in fields such as telecommunications, pulsed Doppler radars or spectroscopy; domains in which the spectral analysis rate of analog signals is critical.

The development of communications has led to an increasingly intensive use of the electromagnetic spectrum (density of signals per unit of frequency), and for increasingly greater maximum frequencies. In addition, many transmitters use frequency hopping techniques.

Analyzing transmissions therefore requires increasing the instantaneous bandwidth, as well as the dynamic and the spectral and temporal resolution of the spectral analysis means. For many applications, the spectral analysis should be as sensitive as possible, making it possible to detect weak signals relative to the ambient noise.

Known digital analysis methods consist of digitizing the signals received by an antenna, before performing digital processing, for example by a fast Fourier transform.

These digital methods have numerous disadvantages.

These techniques require very fast analog-digital converters, with the sampling rate limiting the highest-frequency analysis.

When they do not have good linearity, the converters generate ghost frequencies by producing harmonics.

A signal sampled with a high frequency and a wide band generates an excessive quantity of data for subsequent processing by a computer placed downstream. To overcome this problem, some digital methods of spectral analysis operate by scanning. But if scanning is carried out for example on 20 GHZ, on each sub-band of 1 GHz, with a real-time bandwidth of 1 GHZ, the analyzer is blind 95% of time.

Such techniques do not allow the detection of stealth transmissions of very short durations, for example ultrashort single-pulse transmissions. The sampling rate, on the order of a hundred megahertz, limits the rate of processing to several hundred kilohertz as well as the real-time bandwidth.

To avoid the disadvantages of scanning analysis, it could be envisaged to use several analyzers operating in parallel, in order to cover a large spectral band. However, the devices obtained are very expensive, heavy, and bulky.

Acousto-optic spectrum analyzers are also known, in which the signal to be analyzed is injected into a piezoelectric crystal (Bragg cell) after having been converted into acoustic waves which create variations in diffraction indices. The laser light is introduced into the transparent medium of the acousto-optic cell, and this light is diffracted based on the spectrum of the initial signal. The laser image is collected by a CCD system. The amplitude of the outgoing signal is proportional to the amplitude of the radiofrequency signal and the de-flection angle is virtually proportional to the frequency of the signal. Acousto-optical analyzers have been used in radioastronomy. Reference may be made for example to document WO 2014116128.

In the field of optical frequencies, spectral analysis can be carried out by means of spectrometers such as monochromators. This type of device performs a frequency sweep with a measurement of power at the selected frequency, to within a certain spectral resolution. The control of the mechanical element of the spectrometer allowing the frequency sweep greatly limits the rate of acquisition of the spectrum of the signals to be analyzed, which may reach about ten kilohertz for the highest-performing devices.

In the field of pulsed Doppler radars, the position and speed of targets in motion are determined by the spectral analysis of a reflected pulsed signal, carried out digitally following the sampling of the reflected pulse, measured by an antenna. The low pulse repetition rate limits the maximum speed of the traceable targets.

In the field of telecommunications, various applications such as frequency shift keying (FSK) require that a dominant frequency of an analog signal encoding data be evaluated as quickly as possible, and also be tracked. This may currently be carried out by electronic frequency counters, whose high efficiency is unfortunately not resilient to the presence of noise.

SUMMARY OF THE INVENTION

The invention aims to at least partially overcome the disadvantages of the devices and methods known in the prior art.

A first object of the invention is to allow the extraction of features contained in the noisy radiofrequency signal spectrum, at a rate greater than 10 MHz, advantageously greater than gigahertz, through the use of an opto-electronic device.

A second object of the invention is to allow such extraction which is more resilient to noise than the techniques of the prior art.

A third object of the invention is to allow such extraction at throughput rates greater than those of the techniques of the prior art.

Another object of the invention is to allow the determination of the spectral energy distribution of a radiofrequency pulse as well as the frequency of the maximum of this spectrum, in a time of approximately a few tens of picoseconds, despite the possible presence of noise.

Another object of the invention is to allow an ultra-rapid measurement of the frequency of a noisy continuous sinusoidal signal.

Another object of the invention is an integrated photonic device making it possible to achieve at least one of the objects presented above.

For these purposes, according to a first aspect, the invention relates to an optoelectronic device for extracting features contained in the spectrum of continuous or pulsed, noisy, analog radiofrequency signals, forming an input analog signal, the optoelectronic extraction device comprising:

an input module generating an optical carrier wave and performing a modulation of this optical carrier by the analog input signal, by multiplication/mixing, to form a modulated optical signal;

a network of linear optical cavities optically pumped and coupled by all or some of the modulated optical signal, routed to the network by a light conducting means;

an optical device for directly or indirectly measuring the measured quantities of the optical fields which are: intensities, amplitudes and/or phases of the optical fields within the coupled linear cavities, these optical fields being induced by the optical signal modulated by the input analog signal;

a calculation module connected to the optical measuring device, performing a linear transformation on the measured quantities of the optical fields, by multiplication with a matrix W and addition of a bias vector b, to make it possible to reconstruct and extract targeted features contained in the spectrum of the radiofrequency input signal, the calculation module having carried out machine learning on noisy analog radiofrequency signals having the same targeted features, in order to determine the matrix W and the bias vector b.

The invention relates, according to a second aspect, to a method for extracting features contained in the spectrum of continuous or pulsed, noisy, analog radiofrequency signals, forming an input analog signal, the extraction method using the device as presented above, and comprising:

a step of mixing/multiplying the radiofrequency input signal by modulating an optical carrier wave, to form a modulated optical signal;

a step of optically coupling and pumping a network of linear optical cavities by all or some of the modulated optical signal;

a step of measuring the optical field intensities, amplitudes and/or phases of the cavities;

a step of linear transformation on the measured quantities associated with the fields;

a machine learning step for the linear transformation.

According to various embodiments, the device has the following features, if need be combined:

the linear optical cavities are coupled by fixed or random coupling;

the linear optical cavities are made in the form of nanometric or micrometric structures, etched in a semiconductor or dielectric material, arranged in a network of optical cavities of planar geometry, the network of optical cavities comprising direct couplings between closer neighboring sites, or indirect between arbitrarily distant sites; these optical cavities may have arbitrary shapes, that is to say "only dependent on the intention of the engineer", to reflect the absence of true external technical constraints on the geometry of the planar network (square, triangular, hexagonal, etc.) and the manufacturing thereof;

the network of optical cavities is implemented on a photonic chip.

The photonic chip advantageously comprises laterally coupled ring resonators.

The photonic chip advantageously comprises a network of micro- or nano-pillars.

The photonic chip advantageously comprises a planar network of disc-shaped optical cavities.

The photonic chip advantageously comprises a planar network of cavities based on photonic crystals.

In some implementations, the photonic chip is made of silicon and/or silicon dioxide.

In some implementations, the network of optical cavities is a disordered or ordered assembly of linear optical diffusers, forming a dense material or a scattering diluted medium.

According to various embodiments, the device furthermore has the following features, where appropriate combined:

the input module performing the modulation of the optical carrier by the analog input signal comprises an electro-optical modulator;

the input module generates a plurality of different optical carrier waves modulated by the input signal;

the analog radiofrequency input signals have a frequency limited by the input module;

the network of optical cavities has at least 5×5 optical cavities.

The matrix W is advantageously trained to make it possible to extract the following targeted features:

the spectral density, that is the spectrum, of the input signal the frequency of a peak identified in this spectrum, the spectral form of a pulse, for example Gaussian or Lorentzian.

According to various embodiments, the device has the following features, where appropriate combined:

the device comprises an optical demultiplexer separating the signals transmitted by the various normal modes from the network of cavities, of different wavelength;

the module performing the linear transformation comprises an electronic arithmetic calculation unit, forming a programmable logic circuit, the programmable logic circuit advantageously being a network of gates programmable in-situ;

the optical device for measuring the quantities associated with the fields of the optical cavities comprises a camera arranged opposite the structure of the network of cavities, and is able to measure the intensity, amplitude and/or phase of the light radiated by each cavity;

the optical device for measuring the quantities associated with the fields of the optical cavities comprises waveguides coupled in near-field to the linear optical cavities, and is able to measure the intensity, amplitude and/or phase of the light transmitted at the natural frequencies of the network.

The invention relates, according to another aspect, to an optoelectronic device for extracting features contained in the spectrum of continuous or pulsed, noisy, analog radiofrequency signals, forming an input analog signal, the optoelectronic extraction device comprising:

an input module generating an optical carrier wave and performing a modulation of this optical carrier by the analog input signal, by multiplication/mixing, to form a modulated optical signal;

a network of linear optical cavities optically pumped and coupled by all or some of the modulated optical signal, routed to the network by a light conducting means;

a linear optical module downstream of the network of linear cavities, making it possible to obtain N linear superpositions from N optical fields an radiated by the cavities of the network, the m-th signal thus generated being expressed in the form of a weighted sum of these fields, for example in the form $$x_m = W_{m1}\alpha_1 + W_{m2}\alpha_2 + \ldots + W_{mN}\alpha_N + b_m$$

whose weight matrix W and bias vector b can be attached externally and are advantageously derived from a machine learning process trained on training noisy analog radiofrequency signals;

an optical device for measuring the intensities, amplitudes and/or phases of the N linear superpositions $x_m$ optical fields radiated by the coupled linear cavities, the measurement advantageously producing targeted features in the form of a number vector.

According to various embodiments, the device has the following features, where appropriate combined:
- the weight matrix W is a matrix of complex numbers;
- the linear optical module downstream of the network of cavities comprises an adaptive optical device acting on the amplitude and/or phase of the radiated fields;
- the adaptive optical device comprises a spatial light modulator;
- the adaptive optical device comprises a matrix of micromirrors acting on the amplitude and/or phase of the radiated fields;
- the linear optical module downstream of the network of cavities comprises an integrated or fiber optical device.

The invention relates, according to another aspect, to a method for extracting features contained in the spectrum of continuous or pulsed, noisy, analog radiofrequency signals, forming an input analog signal, the extraction method using the device as presented above, and comprising:
- a step of mixing/multiplying the radiofrequency input signal by modulating an optical carrier wave, to form a modulated optical signal;
- a step of optically coupling and pumping a network of linear optical cavities by all or some of the modulated optical signal;
- a step of linear superposition of the optical fields radiated by the cavities of the network;
- a step of optical measurement of the intensities, amplitudes and/or phases of the linear superpositions of the optical fields radiated by the coupled linear cavities, each linear superposition of the optical fields radiated by the cavities of the network being expressed in the form of a weighted sum of these fields, whose weight matrix W and the bias vector are derived from machine learning trained on training noisy analog radiofrequency signals.

According to another aspect, the invention relates to the use of a device as presented above, to determine the spectral density of a radiofrequency signal, or to determine the angular frequency of a targeted maximum in the spectrum of a radiofrequency signal, or to determine the frequency of a harmonic signal.

According to another aspect, the invention relates to the use of a device as presented above, in telecommunications, for example to decode signals derived from the FSK protocol, or to pulsed Doppler radar analysis.

According to another aspect, the invention relates to the application of a method as presented above, to determine the energy spectral density and/or the dominant frequency of a radiofrequency pulse.

BRIEF DESCRIPTION OF THE DRAWINGS

The features and advantages of the invention will become apparent on reading the following description, given solely by way of example, and made with reference to the accompanying drawings, in which.

DETAILED DESCRIPTION OF EMBODIMENTS

An optoelectronic device is proposed and a method enabling the extraction of features contained in the noisy radiofrequency signal spectrum, at a rate greater than a gigahertz.

The optoelectronic device associates a photonic preprocessing device and an elementary digital computing device previously trained by machine learning.

Figure 1:
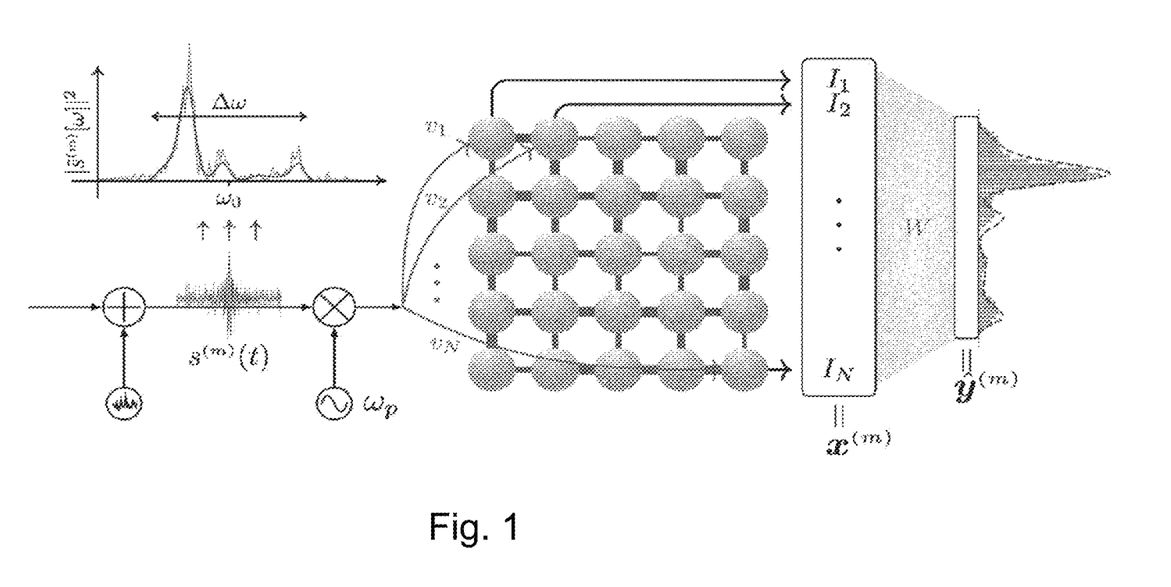
FIG. 1 is a block diagram of a method for extracting features contained in the spectrum of radiofrequency signals, according to one implementation of the invention.

The principle of the method is shown schematically in FIG. 1.

The method comprises a step of mixing/multiplying the radiofrequency input signal $s^{(m)}(t)$ by modulation of an optical carrier wave of angular frequency $\omega_p$, to form a modulated optical signal. The angular frequency $\omega_p$ of the carrier is advantageously chosen such that $$\omega_p = \omega - \omega_0,$$

where $\omega$ denotes the center of the spectrum of a network of optical cavities (typically the average of the angular frequency of the optical cavities) and $\omega_0$, the center of the spectral range on which the analysis of the input signals is to be carried out.

The method comprises a step of optically coupling and pumping a network of linear optical cavities by all or some of the modulated optical signal.

The method comprises a step of measuring the intensities, amplitudes and/or phases of the optical fields of the N cavities (M numerical values forming a vector of numbers of size M, denoted $x^{(m)}$)

The method comprises a step of linear transformation on the measured quantities associated with the fields, returning new vectors $(\hat{y}_1^{(m)}, \ldots, \hat{y}_K^{(m)})$ of the format $$\hat{y}_i^{(m)} = W_i \cdot x^{(m)} + b_i$$

by multiplication with a matrix W and addition of a bias vector b.

The method comprises a machine learning step for the linear transformation, to determine the parameters W and b.

Figure 2:
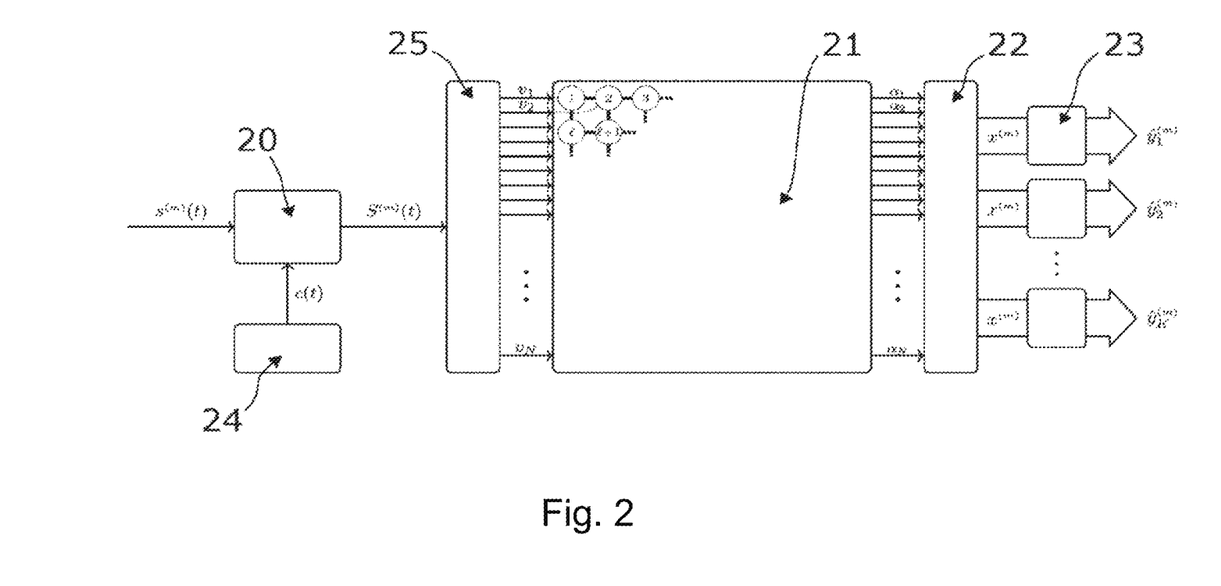
FIG. 2 is a block diagram of a device for extracting features contained in the spectrum of radiofrequency signals, according to one implementation of the invention.
Figure 3:
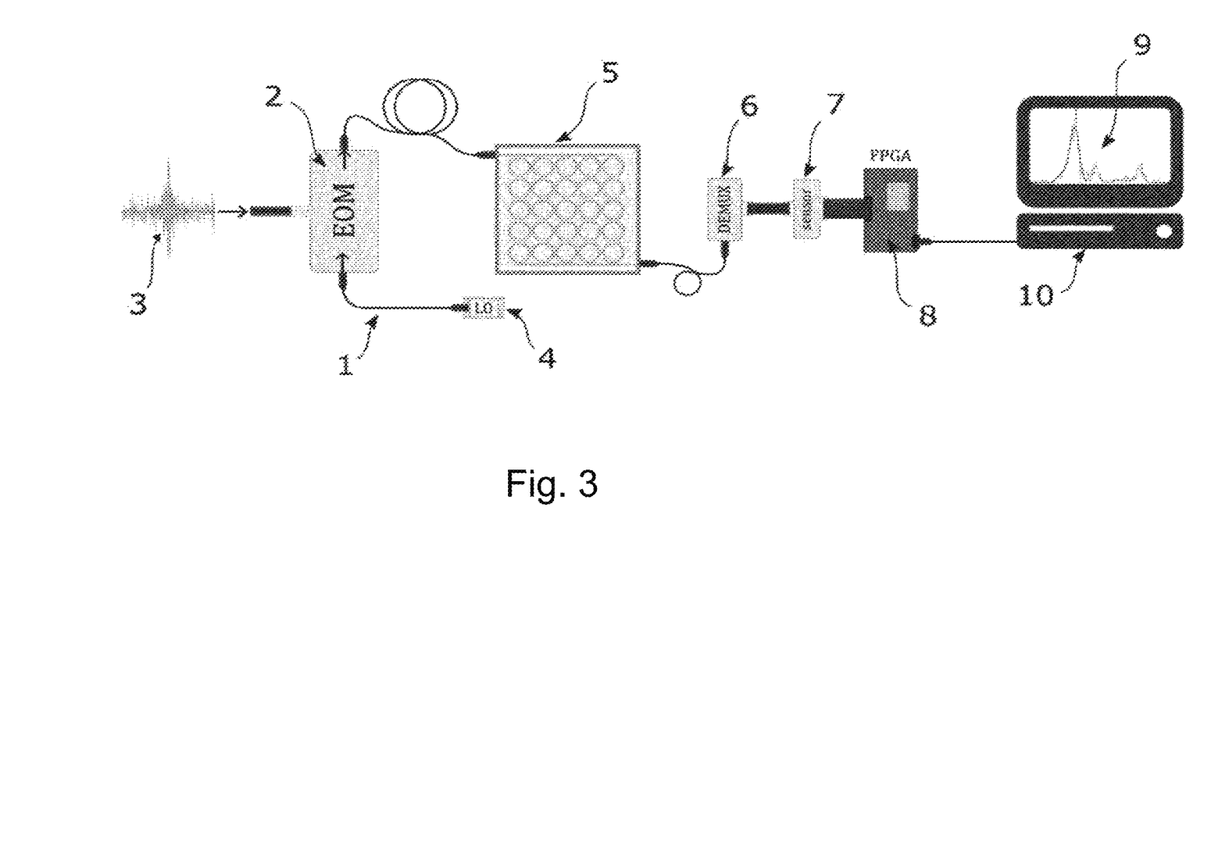
FIG. 3 is a schematic representation of the device of FIG. 2, in a fiber-based telecom implementation.

The method is advantageously implemented by a device shown in FIG. 3, or shown schematically in FIG. 2.

In an implementation of the fiber-based telecom type, shown in FIG. 3, a carrier 1 at a telecom frequency is modulated by an electro-optical modulator 2 (EOM) as a function of the input radiofrequency signal 3.

In the embodiment shown schematically in FIG. 3, the input radiofrequency signal 3 is a noisy signal, of the pulse type.

In other embodiments, not shown, the input radiofrequency signal is a continuous, noisy or non-noisy signal.

The various elements are not shown to scale in FIG. 3.

The carrier 1 is for example derived from a telecom laser diode 4.

The signal exiting the modulator 2 is routed to a photonic chip 5.

In one embodiment, the photonic chip 5 is a planar silicon chip comprising laterally coupled micro-ring resonators. A micro-ring resonator comprises a ring, typically of a size ranging from a few microns to a few tens of microns, and one or two straight waveguides. In laterally-coupled micro-ring resonators, the guides and the ring are manufactured with the same layer. The micro-rings may be in the form of a circle, or a racetrack, or a disc.

The modulated field is coupled to the rings of the network by a first waveguide. The radiation transmitted by the structure at each natural frequency of the network is extracted by means of a second waveguide.

An optical demultiplexer 6 separates the signals transmitted by the various normal modes, different wavelengths, the intensity of which is measured by means of a sensor 7.

In one embodiment, the sensor 7 comprises a row of photodiodes.

The measured intensities are transformed by a component 8, in order to obtain the initial radiofrequency pulse spectrum.

In some implementations, the component 8 is a programmable electronic component, in particular of the FPGA (Field-Programmable Gate Array) type comprising a network of programmable cells.

The initial radiofrequency pulse spectrum 3 is presented on a screen 9 of a terminal 10, for example a computer, a server, or a mobile communication terminal.

An optoelectronic device, shown schematically in FIG. 2, advantageously comprising four modules consecutively passed through by the input signal to be analyzed, is proposed:
- a module 20 operating a mixing of the input radiofrequency signal $s^{(m)}(t)$ with an optical carrier c(t), by modulating same,
- a network 21 of linear optical cavities mutually optically pumped and coupled by the optical carrier modulated by the signal,
- a sensor 22 directly or indirectly measuring the optical populations of the cavities of the network 21,
- a module 23 performing on the measured quantities a previously optimized linear transformation in order to maximize the amount of information effectively extracted from the input signal.

The prior optimization of the parameters of the linear transformation, carried out by machine learning trained on a set of known signals, allows the optoelectronic device to perform a feature extraction more resilient to noise than the prior art, while operating at higher throughput rates.

The optoelectronic device also differs from existing radiofrequency spectral analysis devices, by transferring a majority of the analysis operations to a non-electronic physical system, advantageously an optical system.

The radiofrequency input signal and its features are transposed on an optical carrier, and the feature extraction is enabled by the optical interactions between cavities and by the optical measurement.

The optoelectronic device is capable, at least, of determining the spectral energy distribution of a radiofrequency pulse, the angular frequency of the maximum of this spectrum, as well as the frequency of a harmonic signal, over a time on the order of a few tens of picoseconds.

This performance, which goes beyond the prior art, can be achieved despite the presence of undesirable noise.

The optoelectronic device is favorably used in the field of telecommunications, e.g. frequency-shift keying (FSK); imaging, e.g. pulse-Doppler techniques; or machine learning, e.g. as a pre-processing step (non-trivial digital encoding of analog signals) or optical coprocessor.

The optoelectronic device is provided with at least one input accepting continuous or pulsed radiofrequency signals and a digital output.

The optoelectronic device comprises several sub-parts, shown schematically in FIG. 2.

A first sub-part of the device is a module comprising an optical local oscillator 24 generating an optical carrier c(t), and a signal modulator 20, e.g. mixer/multiplier.

The modulator 20 generates a signal $S^{(m)}(t)$, by phase or amplitude modulation of the optical carrier c(t) as a function of the radiofrequency input signal $s^{(m)}(t)$.

In some implementations, several modulators 20 are implemented, in order to generate a plurality of optical signals modulated from a single input signal $s^{(m)}(t)$.

For the digital simulations of the device presented below, modulation by a multiplier (frequency mixer) of a single optical carrier was used.

The optical carrier, of complex amplitude c(t), is characterized by a complex frequency and amplitude. The angular frequency $\omega_p$ of the carrier $$c(t) \sim \exp(-i\omega_p t)$$

is chosen such that $$\omega_p = \omega - \omega_0,$$

where ω denotes the center of the spectrum of a network 21 of optical cavities (typically the average of the angular frequency of the optical cavities) and $\omega_0$, the center of the spectral range on which the analysis of the input signals is to be carried out.

The width Δω of this range is equal to the spectral width of the network 21 ($\Delta\omega \approx 4J_{max}$, for a square network of cavities with coupling constants between cavities J uniformly distributed between 0 and $J_{max}$), so that, for this choice of $\omega_p$, the device performs its analysis in the radiofrequency range $[\omega]_0 - \Delta\omega/2; \omega_0 + \Delta\omega/2]$.

A second subpart of the device is a system 25 making it possible to route the optical signal thus generated to the various sites of the network 21 of optical cavities. The amplitude of the effective pumping of the sites of the network 21 (i.e. individual cavities constituting the network) is proportional to the amplitude of the optical signal conveyed to the site, though with coefficients of proportionality $v_n$ can depend on the site.

This routing can be carried out in various ways in a photonic implementation: by means of optical waveguides coupled laterally to the cavities, by near-field, or by far-field illumination of the sites of the network.

A third subpart of the device is a network 21 of N linear optical cavities coupled and pumped by all or some of the modulated optical signal. Each site corresponds to an optical cavity with at least one useful optical mode.

Such cavities can be made in an integrated manner, in particular in the form of nanostructures, which can be etched in the same block of semiconductor or dielectric material. The network of cavities may be of arbitrary geometry in principle in the plane, with direct couplings between closer neighboring sites, or indirect couplings between arbitrary sites.

In one implementation, the network 21 is a network of semiconductor micropillars, which makes the measurement of optical populations very simple by vertical apposition of a sensor opposite the matrix of cavities.

In another embodiment, the network 23 is a planar network of optical cavities in rings.

The maximum amplitude of the range of frequencies at which the device will be sensitive depends essentially on the absolute value of the coupling between the cavities.

Thus, the choice of very high frequency cavities (smaller) is advantageously preferred, in order to maximize this spectral amplitude. This quantity can be optimized by numerical simulations and characterized a posteriori on the networks produced.

The physical features of the network only depend on its manufacture and on the conditions of its environment (temperature, etc.), and in no way on the input signal, and are assumed to be stable over time. Each optical mode is described by a natural frequency and a relaxation rate.

In the absence of an input signal, the photonic population of these modes, as well as their state, generally, is fixed, optionally by an additional optical pumping independent of the input signals.

The incoming modulated optical signals act on these modes in the form of coherent pumping and induce measurable modification of their photonic populations. The couplings J between neighboring cavities are likely to induce spatial correlations between the populations or the coherences of the excitations stored in distinct cavities. The values J of these couplings generally have a spatial heterogeneity within the planar network.

A fourth sub-part of the device is a device 22 performing a measurement of the amplitude, phase or intensity of the optical fields of the optical cavities, for example, the measurement of the intensity $I_n$ of the light radiated by each cavity n, by means of a camera arranged facing the network structure; or the measurement of the photonic populations of the normal optical modes of the coupled network, for example by measuring the intensity of the light transmitted at the natural frequencies of the network in a near-field coupled optical waveguide.

This device 22 returns the measured quantities (M values, N varying from 1 to N; typically M=N) in digital format in the form of a vector of numbers of size M denoted $x^{(m)}$, where M is the index associated with the m-th input signal $s^{(m)}(t)$ to be analyzed. This vector contains the quantities measured during the integration time of the sensor in the transient or steady state, but could also aggregate several measurements spaced out over time.

A fifth subpart of the device comprises one or more electronic arithmetic calculation units 23, e.g. field-programmable gate arrays (FPGA), capable of performing affine transformations of the vector from the preceding device, returning new vectors $(\hat{y}_1^{(m)}, \ldots, \hat{y}_K^{(m)})$ of the format $$\hat{y}_i^{(m)} = W_i \cdot x^{(m)} + b_i$$

and with dimensions possibly different from those of the preceding vector.

The parameters $(W_i, b_i)$ of the affine transformations described above must be able to be adjusted arbitrarily at least a first time, during the optimization process associated with the analysis task.

But once fixed at the end of optimization, the parameters $(W_i, b_i)$ remain independent of the input signal. The values of these parameters are chosen so that they minimize certain cost functions defined by the analysis task.

The training (learning) process advantageously takes place in a single preliminary step according to the following diagram:

(i) A set of $N_{train}$ training signals $s^{(m)}(t)$ (m=1, ..., $N_{train}$), including K target features describable by a series of vectors $(y_1^{(m)}, \ldots, y_K^{(m)})$ are known (e.g. by using the prior art or by controlling their generation), are transmitted at the input of the device, generating $N_{train}$ vectors of measured quantities $(x^{(1)}, \ldots, x^{(Ntrain)})$.

(ii) Each vector is transformed by the arithmetic calculation units in order to obtain a series of predictions $(\hat{y}_1^{(m)}, \ldots, \hat{y}_K^{(m)})$ associated with the target features $(y_1^{(m)}, \ldots, y_K^{(m)})$.

(iii) The predictions associated with the m-th signal $(\hat{y}_1^{(m)}, \ldots, \hat{y}_K^{(m)})$ depend parametrically on the weights ($W_i$, $b_i$) (where i=1, ..., K).

Thus, it is possible to optimize these weights, so that the error $E_{train}$ between the predictions $(\hat{y}_1^{(m)}, \ldots, \hat{y}_K^{(m)})$ and the targeted amounts $(y_1^{(m)}, \ldots, y_n^{(m)})$ is minimized.

This error can always be minimized iteratively by algorithms of the prior art, such as, e.g., the gradient descent, without the need to reassess the vectors $(x^{(1)}, \ldots, x^{(Ntrain)})$.

In particular, for a typical choice of error function, expressed as the least squares, $E_{train} = \Sigma_{m,i} |\hat{y}_i^{(m)} - y_i^{(m)}|^2$, optionally complemented by ridge regularization, the optimal weights can be determined by a simple matrix inversion.

(iv) Once the weights of the arithmetic units ($W_i$, $b_i$) have been fixed at their optimum values, the quality of the prediction can be evaluated on a series of $n_{test}$ test signals $s^{(m)}(t)$ whose targeted features are also known in advance but to which the device has never been exposed.

In this way, from the error $E_{test}$ of the device, on all the test signals, good estimation of the efficiency of the device when confronted with unknown signal is obtained.

The performance of the invention will now be presented.

Different digital simulations, in various configurations, make it possible to compare the performance of the invention with those of a digital fast Fourier transform.

The details of these simulations is given below.

The response to the m-th modulated signal $S^{(m)}(t)$ of the linear optical cavity network can be faithfully modeled by means of the system of differential equations:

$$\frac{d\alpha_l(i)}{dt} = [i(\Delta_l + \omega_0) - \kappa_l/2]a_l(t) + i \sum_{m \in e(l)} J_{(m,l)} a_m(t) + i v_l S^{(m)}(t),$$

where
$\alpha_l$ denotes the optical field of l-th cavity;
$\Delta_l = \omega_p - \omega_l$, the detuning of the l-th cavity;
$\omega_l$, the angular frequency of the l-th cavity;
$\omega_0$, the center of the spectral band to be analyzed;
$K_l$, the dissipation rate of the l-th cavity;
$J_{<m,l>}$, the coherent coupling between cavities m and l;
$v_l$, the weight of the coupling of the input signal at the site l.

The sensor is modeled by a temporal average of the intensities $$I_\ell(t) = |\alpha_\ell(t)|^2$$

over a time greater than the relaxation time $1/K_l$, resulting in an intensity vector $x^{(m)}$.

The parameterized affine transformation is carried out by a simple matrix multiplication $\hat{y}^{(m)} = W x'^{(m)}$, où $x'^{(m)} = (1, x^{(m)})^T$, whose weights W are numerically optimized during the training step.

The example of the extraction of energy spectral density (ESD) of pulses in the presence of noise by a square network of L×L linear cavities is described in detail below.

A set of pulses $s^{(m)}(t)$ is generated by inverse Fourier transform from $N_{train}$ random complex spectra $s^{(m)}[\omega]$, where $$s^{(m)}[\omega] = TF\{s^{(m)}(t)\},$$

whose spectral energy density, $$ESD^{(m)}[\omega] = |s^{(m)}[\omega]|^2,$$

is provided with a certain structure (i.e. more correlated than noise).

Then, white noise is added, until a certain signal-to-noise ratio, denoted SNR, is reached.

This SNR ratio is here chosen as the ratio of the energy of the signal and of the noise to the target range of angular frequencies $[\omega_0 - \Delta\omega/2; \omega_0 + \Delta\omega/2]$.

The known training and test spectra are uniformly sampled in a set of $N_b$ bins of the format $$y_k^{(m)} = ESD^{(m)}[\omega_0 - \Delta\omega/2 + (k-1)\Delta\omega/(N_b-1)].$$

Moreover, the digital integration of the system of equations described above results in $N_{train}$ vectors $x'^{(m)}$, of dimension $L^2+1$, which is transformed by a matrix W of size $N_b \times (L^2+1)$ such that $\hat{y}^{(m)} = W x'^{(m)}$, these latter vectors constitute the evaluation of the spectrum by the device.

For this task, training consists of finding the matrix W* minimizing the gap between the original non-noisy spectra $y^{(m)}$, which it is sought to determine, and the predictions made by the device $\hat{y}^{(m)}$.

In an equivalent manner, the optimum mean squared error is sought $$C[W] = (1/N_{train}) \sum_m |\hat{y}^{(m)} - y^{(m)}|^2 + (\lambda/2)|W|_2^2$$

where the last term is a ridge regularization term.

For this cost function, the optimum matrix W* is given analytically by $$W*^T = (X^T X + \lambda 1)^{-1} X^T Y$$

where $x_{ij} = x'^{(i)}_j$ and $Y_{ij} = y_j^{(i)}$.

The hyperparameter $\lambda$ of the ridge regularization is adjusted by grid search during a 10-block cross validation procedure on the training set.

Once the matrix W has been set at its optimum value W*, previously determined, the predictions of the device for an m-th signal are given by $\hat{y}^{(m)} = W^* x'^{(m)}$.

In order to evaluate the accuracy thereof, $N_{test}$ new noisy random pulses, to which the device has never been exposed during training, are generated, then the relative quantity of energy of the poorly classified pulse is evaluated $$\Delta E/E_0 = (1/N_{test}) \sum_m |\hat{y}^{(m)} - y^{(m)}|/|y^{(m)}|,$$

relevant metric to quantify the error in this task.

Figure 4:
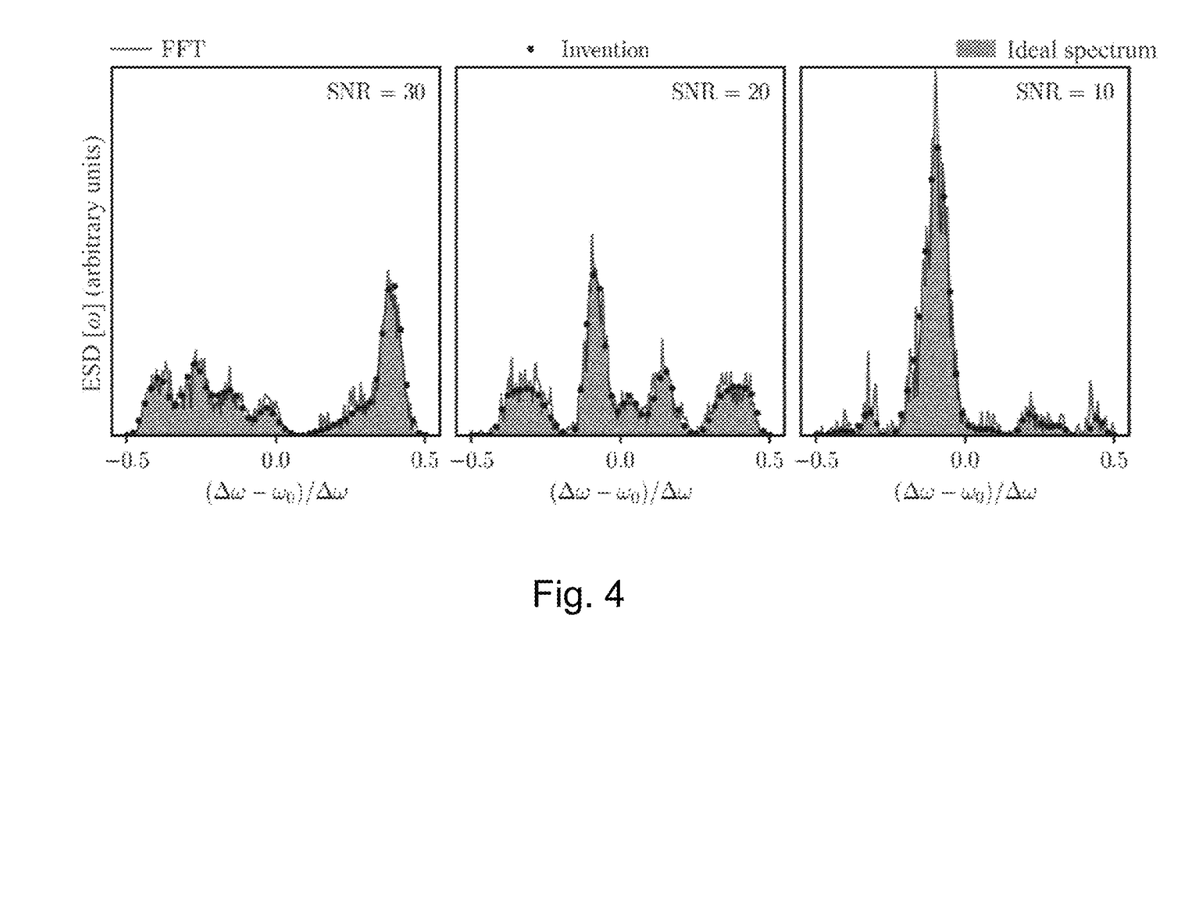
FIG. 4 is a representation of the performance of the method according to the invention, for a 30×30 cavity network, for a plurality of signal-to-noise ratio SNR values.

The typical performance of the invention for a network 21 of 30×30 cavities is shown in FIG. 4, on three of the 3000 signals of the test set for several values of the signal-to-noise-ratio SNR.

The original spectrum before the addition of noise to be reconstructed is reproduced therein in the form of a grayed-out area. The estimation made by the invention, after training on 7000 random signals per SNR value, is represented by dots. The spectrum of the noisy signal is represented by a solid line.

The estimate made by the invention is very close to the original spectrum before the noise is added. The invention is capable of faithfully reproducing details hidden in the noisy background.

Figure 5:
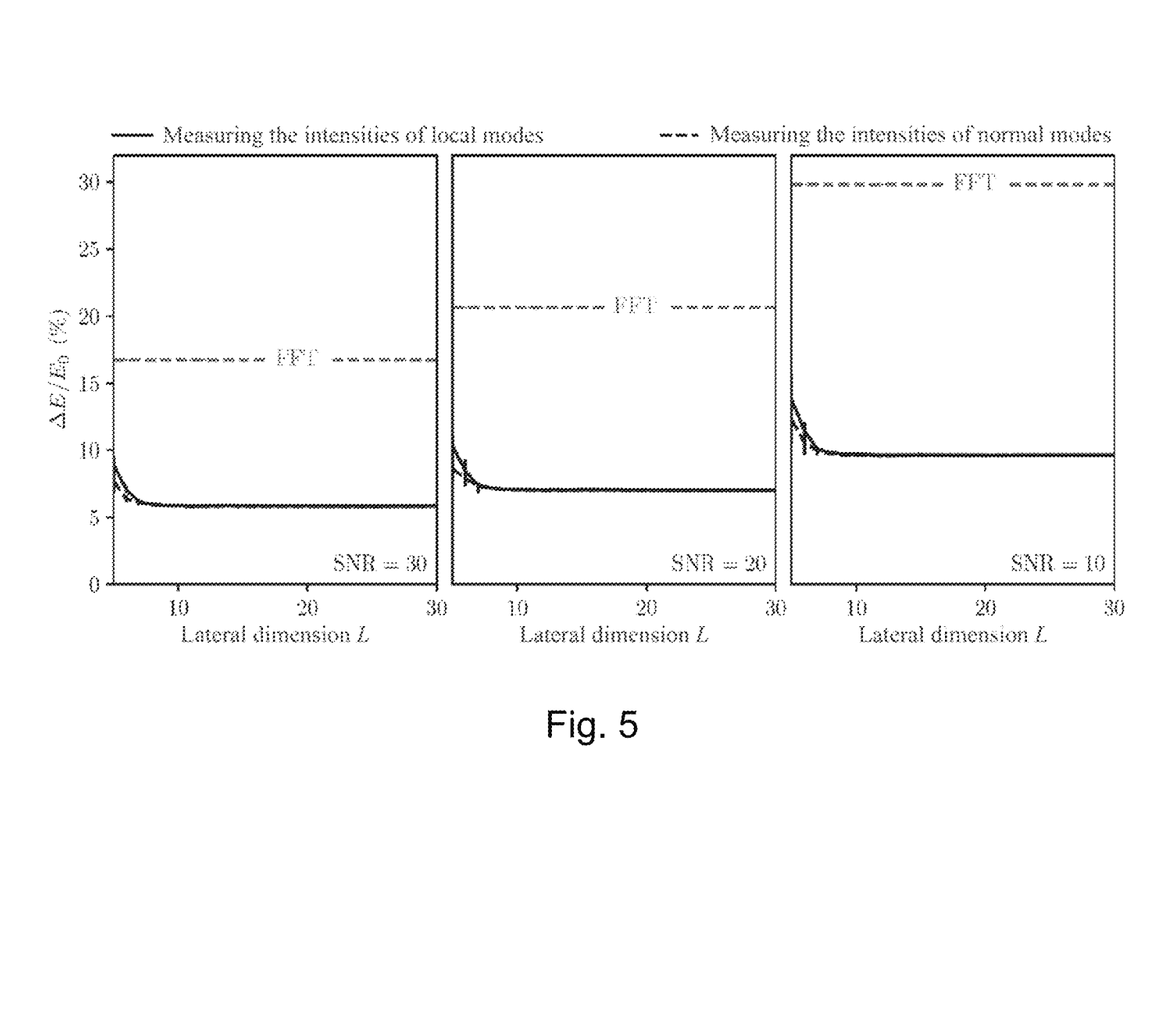
FIG. 5 is a comparison of the performance of the method according to the invention with the performance of a fast Fourier transform of the signal with an ideal sampling rate, for a plurality of signal-to-noise ratio SNR values.

The error $\Delta E/E_0$ (in %) on the set of 3000 test signals, as evaluated by the error metric introduced above, is shown on the y-axis in FIG. 5, for a square network with sides of L ($N=L^2$ cavities) for various values of this parameter, for both types of optical populations (intensities).

The error of the invention for two types of intensity measurements (solid line in FIG. 5) is compared to that of the Fast Fourier Transform (FFT) of the signal, assuming, in the latter case, an ideal sampling of the noisy signal, showing that the invention is more precise on this task beginning at L=5.

These data are averaged over five random embodiments of the parameters of the optical network and the coupling coefficients $v_n$; the vertical error bars in FIG. 5 surround the extreme values of the error for these five embodiments.

This shows the relaxed constraints imposed by the principle of the invention as to the degree of control of the manufacture of its central element. On these same data sets (X, Y), training was carried out for a classifier of the format $\hat{y}^{(m)} = \sigma(W_2 x'^{(m)})$, where $\sigma$ denotes the softmax function, parameterized by a second weight matrix $W_2$.

This training aims to determine the angular frequency at which the power of the signal is maximal, that is to say the position of the highest peak of the spectrum; its optimization step was carried out by stochastic gradient descent by the Adam algorithm.

Since the spectra can contain multiple peaks, it is not desired to directly predict the position of the peak.

Instead, the analysis spectral range is sampled at $N_b$ (here 50) bins of width $\Delta\omega = \Delta\omega/N_b$, and the aim is to estimate by $\hat{y}_i^{(m)}$ the presence probabilities $y_i^{(m)}$ of the maximum peak in the i-th bin.

The position of the peak for the m-th signal is then obtained at close to $\delta\omega$, finding the maximum component of the vector $\hat{y}^{(m)}$.

In ambiguous situations, e.g. two peaks of similar height, the vector $\hat{y}^{(m)}$ has two fairly equally likely components. Thus, the invention also provides the user with means for estimating the quality of the prediction, which grows higher as the associated probability approaches one.

Figure 6:
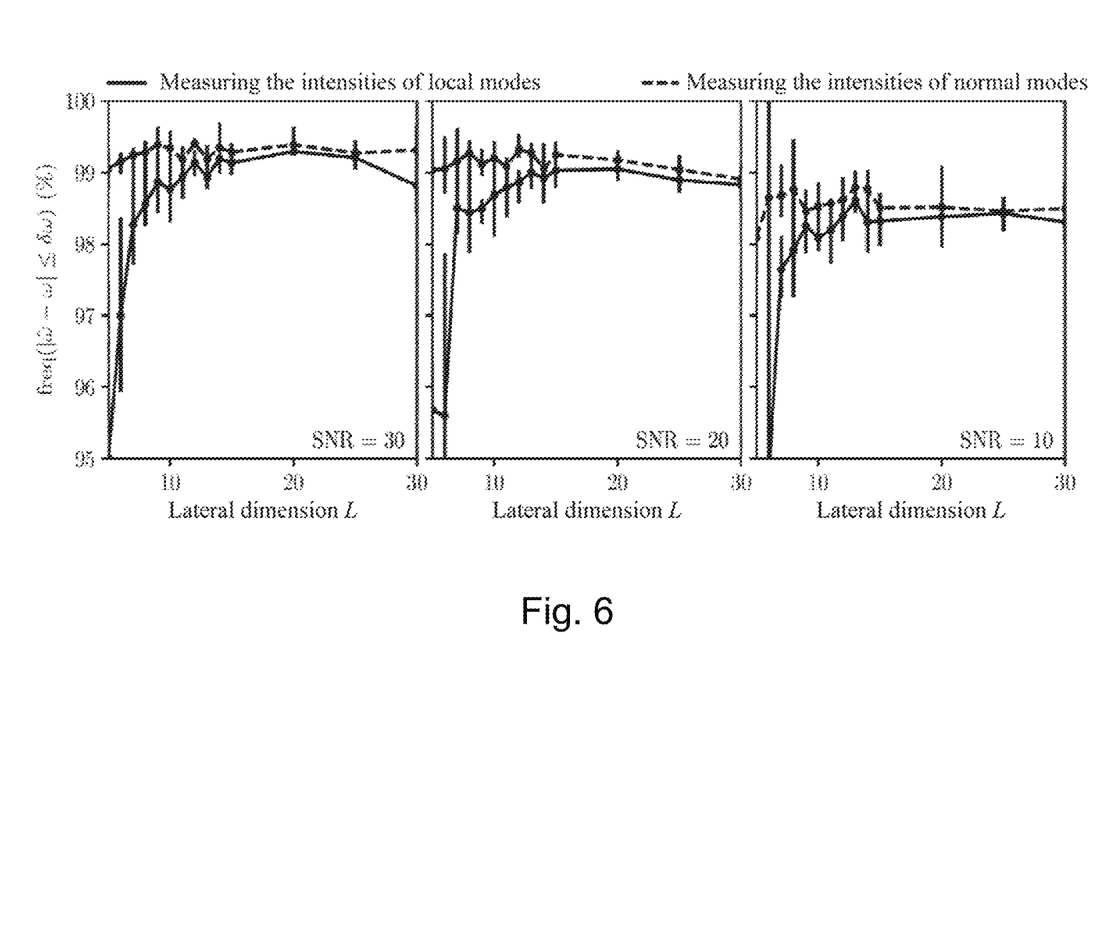
FIG. 6 is a comparison of the probabilities of presence of the maximum power peak obtained by training a device according to the invention, for a plurality of signal-to-noise ratio SNR values.

The results of this second training are shown in FIG. 6, for three values of the signal-to-noise ratio.

The diagrams in FIG. 6 show the results obtained by a treatment according to the invention, for measuring the intensities of normal modes (in black dashes) or intensities of the local modes (in black continuous lines).

As in FIG. 5, these data are averaged over five random embodiments of the parameters of the optical network and the coupling coefficients $v_n$; the vertical error bars in FIG. 6 surround the extreme values of the error for these five embodiments.

Figure 7:
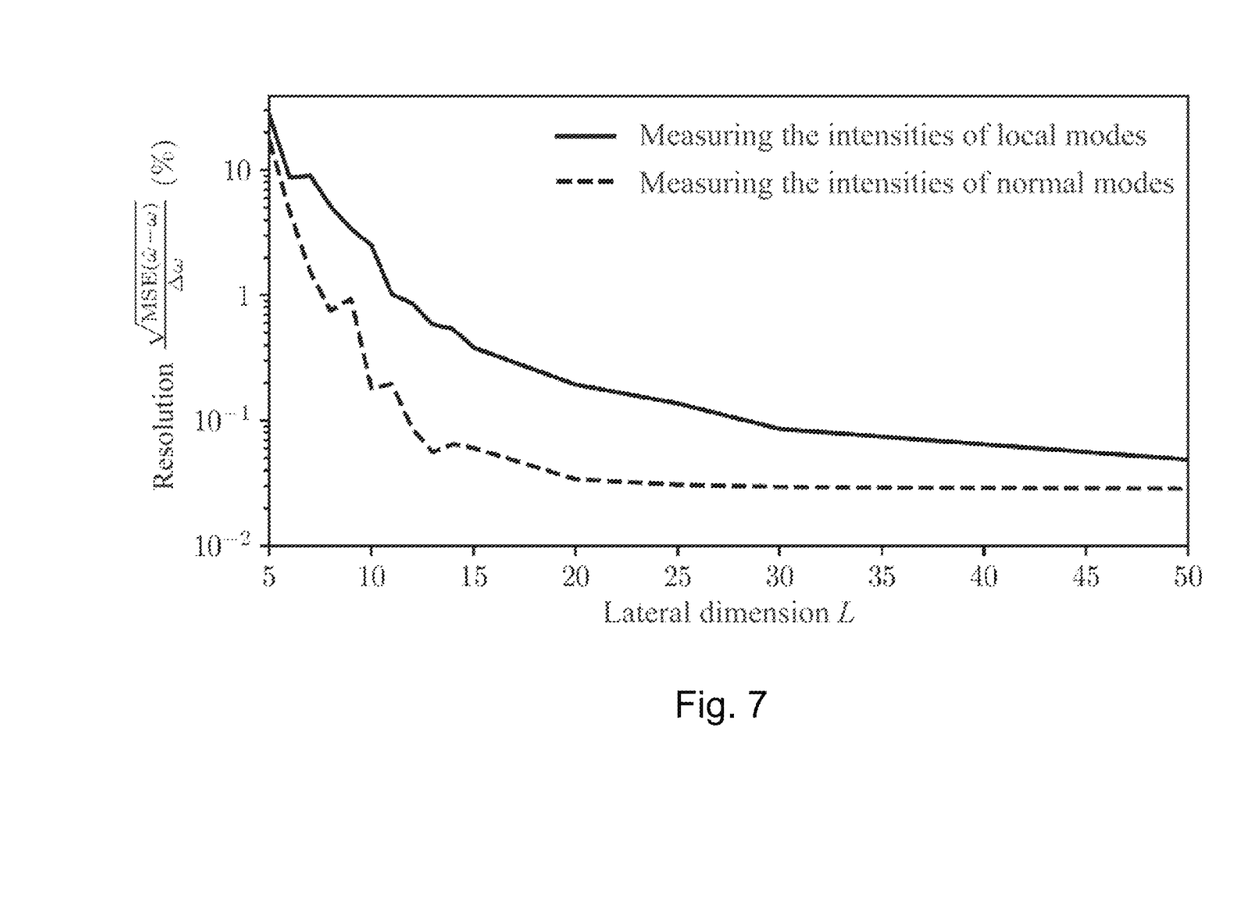
FIG. 7 shows the capacities of a device according to the invention for the ultra-rapid measurement of the frequency of a noisy continuous sinusoidal signal, for a signal-to-noise ratio SNR equal to 20.

The possibility of performing an ultra-rapid measurement of the frequency of a noisy continuous sinusoidal signal is shown in FIG. 7.

To simulate this task, noisy sinusoidal signal (SNR=20) are generated with initial random frequencies and phases injected at the input of the device.

A simple transformation $\hat{y}^{(m)} = w \cdot x'^{(m)}$, parameterized by a duly trained weight vector w, makes it possible to estimate the angular frequency $y^{(m)}$ of the m-th starting signal after a few tens of picoseconds.

The results obtained are presented in FIG. 7, for a measurement of the intensities of normal modes (dashed curve) and for a local measurement (solid line curve).

The invention has numerous advantages.

The invention makes it possible to directly extract the spectral information from an analog radiofrequency signal, without ever having to perform a digital pre-processing thereof, a digital conversion, or even to perform a temporal sampling.

The invention operates at a throughput which may be greater than gigahertz, advantageously tens of gigahertz, by exploiting the ultra-short characteristic time of an optical and linear physical system, an unprecedented rate for such operations.

The invention is implementable in the form of an integrated photonic device; the computing load is based on hardware that is not electronic, but rather optical.

The invention is also distinguished from methods of the prior art, by the possibility of performing several operations simultaneously from a single measurement procedure.

Also, by means of ad hoc training, it can be reprogrammed. Using the proposed protocol for training on noisy signals, identified and validated by broad campaigns of digital simulations, the results obtained by the invention are resilient to the presence of noise, more so than a simple FFT.

The invention does not require any nonlinear optical medium.

Due to the linearity of the optical cavities used, the invention could not considered a standard neuromorphic reservoir computing device, from which it is distinguished by its simplicity.

The invention makes it possible to determine, in a few tens of picoseconds, the spectral energy density of a pulse as well as its dominant frequency, or the frequency of a continuous signal.

Thus, in the field of optics and the analysis of radiofrequency signals, the invention makes it possible to carry out the tasks usually carried out by spectrographs and monochromators.

In the field of telecommunications, the invention, by its high throughput rate, makes it possible to decode signals derived from frequency-shift keying (FSK) protocols, which, therefore, may operate at higher rates.

In the field of pulsed Doppler radar analysis, the invention makes it possible to increase the maximum speed at which targets in motion can be detected, which was limited in the prior art by the repetition frequency of the pulses, chosen to be sufficiently low to allow the analysis thereof.

The invention claimed is:

1. An optoelectronic device for extracting features contained in a spectrum of continuous or pulsed, noisy, analog radiofrequency signals, forming an input analog signal, the optoelectronic device comprises:
   an input module generating an optical carrier wave and performing a modulation of this optical carrier wave by the input analog signal, by multiplication/mixing, to form a modulated optical signal;
   a network of linear optical cavities optically pumped and coupled by all or some of the modulated optical signal, routed to the network by a light conducting means;
   an optical device for measuring quantities of optical fields, the measured quantities being intensities, amplitudes and/or phases of the optical fields within the coupled linear optical cavities, these optical fields being induced by the modulated optical signal by the input analog signal;
   a calculation module connected to the optical device, performing a linear transformation on the measured quantities of the optical fields, by multiplication with a matrix W and addition of a bias vector b;
   to make it possible to reconstruct and extract targeted features contained in the spectrum of the analog radiofrequency input signal,
   the calculation module having carried out machine learning on noisy analog radiofrequency signals having the same targeted features, in order to determine the parameters W and b.

2. The optoelectronic device according to claim 1, wherein the optoelectronic device extracts the features without making use of non-linear optical units between the network of linear optical cavities and a measurement device, or sampling of the analog input signal.

3. The optoelectronic device according to claim 1, wherein the optoelectronic device extracts the features at a rate greater than a gigahertz.

4. The optoelectronic device according to claim 1, wherein the linear optical cavities are coupled by fixed couplings.

5. The optoelectronic device according to claim 1, wherein the linear optical cavities are coupled randomly.

6. The optoelectronic device according to claim 1, wherein the linear optical cavities are made in the form of nanometric/micrometric structures etched in a semiconductive or dielectric material, arranged in a network of optical cavities of planar geometry, with direct couplings between closer neighboring sites, or indirect couplings between arbitrarily distant sites.

7. The optoelectronic device according to claim 1, wherein the network of linear optical cavities is implemented on a photonic chip.

8. The optoelectronic device according to claim 7, wherein the photonic chip comprises laterally coupled ring resonators, or a network of micro or nano-pillars, or a planar network of disc-shaped optical cavities, or a planar network of cavities based on photonic crystals.

9. The optoelectronic device according to claim 7, wherein the photonic chip is made of silicon and/or silicon dioxide.

10. The optoelectronic device according to claim 1, wherein the network of linear optical cavities is a disordered or ordered assembly of linear optical diffusers, forming a dense material or a scattering diluted medium.

11. The optoelectronic device according to claim 1, wherein the input module performing the modulation of the optical carrier wave by the input analog signal comprises an electro-optical modulator.

12. The optoelectronic device according to claim 1, wherein the input module generates a plurality of different optical carrier waves modulated by the input analog signal.

13. The optoelectronic device according to claim 1, wherein an analog radiofrequency input signal has a frequency limited by the input module.

14. The optoelectronic device according to claim 1, wherein the network of optical cavities has at least 5×5 optical cavities.

15. The optoelectronic device according to claim 1, wherein the matrix W is trained to extract the following targeted features:
 a spectral density, that is the spectrum, of the input signal,
 a frequency of a peak identified in this spectrum,
 a spectral form of a pulse, for example Gaussian or Lorentzian.

16. The optoelectronic device according to claim 1, further comprising an optical demultiplexer separating signals transmitted by the different normal modes of a network of linear optical cavities, of different wavelengths.

17. The optoelectronic device according to claim 1, wherein the calculation module performing the linear transformation comprises an arithmetic electronic computing unit, forming a programmable logic circuit.

18. The optoelectronic device according to claim 17, wherein the programmable logic circuit is a network of gates programmable in-situ.

19. The optoelectronic device according to claim 1, wherein the optical device for measuring the measured quantities associated with the optical fields of the linear optical cavities comprises a camera arranged opposite a structure of a network of linear optical cavities, and is able to measure the intensity, amplitude and/or phase of light radiated by each coupled linear cavity.

20. The optoelectronic device according to claim 1, wherein the optical device for measuring the measured quantities associated with the optical fields of the coupled linear cavities comprises waveguides coupled in near-field to the linear optical cavities, and is able to measure the intensity, amplitude and/or phase of light transmitted at natural frequencies of the network.

21. An optoelectronic device for extracting features contained in a spectrum of continuous or pulsed, noisy analog radiofrequency signals, forming an input analog signal, the optoelectronic device comprising:
 an input module generating an optical carrier wave and performing a modulation of this optical carrier wave by the input analog signal, by multiplication/mixing, forming a modulated optical signal;
 a network of linear optical cavities optically pumped and coupled by all or some of the modulated optical signal, routed to the network by a light conducting means;
 a linear optical module downstream of the network of linear optical cavities, making it possible to obtain N' linear superpositions from optical fields radiated by the couple linear optical cavities of the network, an m-th signal thus generated being expressed in the form of a weighted sum of optical fields, wherein a weight matrix W and bias vector b come from a machine learning process trained on training noisy analog radiofrequency signals;
 an optical device for measuring intensities, amplitudes, and/or phases of an N' linear superpositions of the optical fields radiated by the coupled linear optical cavities.

22. The optoelectronic device according to claim 1, wherein the weight matrix W is a matrix of complex numbers.

23. The optoelectronic device according to claim 21, wherein the linear optical module downstream of the network of linear optical cavities comprises an adaptive linear optical device acting on the amplitude and/or phase of the radiated optical fields.

24. The optoelectronic device according to claim 23, wherein the optical device comprises a spatial light modulator.

25. The optoelectronic device according to claim 23, wherein the optical device comprises a matrix of micromirrors.

26. The optoelectronic device according to claim 21, wherein the linear optical module downstream of the network of linear optical cavities comprises an integrated or fiber optical device.

* * * * *